(12) United States Patent
Aliev

(10) Patent No.: US 10,394,105 B2
(45) Date of Patent: Aug. 27, 2019

(54) PORTABLE APPARATUS FOR PROVIDING ACOUSTIC AND/OR WEATHER SHIELDING FOR AUDIO AND/OR VIDEO RECORDING DEVICES

(71) Applicant: Adil Aliyevich Aliev, Jefferson, MD (US)

(72) Inventor: Adil Aliyevich Aliev, Jefferson, MD (US)

(*) Notice: Subject to any disclaimer, the term of this patent is extended or adjusted under 35 U.S.C. 154(b) by 72 days.

(21) Appl. No.: 15/637,300

(22) Filed: Jun. 29, 2017

(65) Prior Publication Data
US 2019/0004399 A1  Jan. 3, 2019

(51) Int. Cl.
| F16M 11/10 | (2006.01) |
| G03B 11/04 | (2006.01) |
| H04N 5/225 | (2006.01) |
| H04R 3/00 | (2006.01) |
| G03B 17/56 | (2006.01) |

(52) U.S. Cl.
CPC ........... *G03B 11/04* (2013.01); *G03B 17/568* (2013.01); *H04N 5/2252* (2013.01); *H04R 3/007* (2013.01); *H04R 2499/11* (2013.01)

(58) Field of Classification Search
CPC ......... G03B 17/56; G10K 11/16; F16M 11/10
USPC ............... 396/534, 428; 352/35; 181/198
See application file for complete search history.

(56) References Cited

U.S. PATENT DOCUMENTS

| 1,962,441 A * | 6/1934 | Haddock | G03B 31/00 181/198 |
| 1,966,288 A | 7/1934 | Foltz | |
| 3,611,907 A | 10/1971 | Wasserman et al. | |
| 3,905,444 A | 9/1975 | Evans, Jr. | |
| 3,935,923 A | 2/1976 | Wheeler | |
| 3,951,228 A | 4/1976 | Schnell | |
| 4,942,938 A | 7/1990 | Wiegel | |
| 5,123,874 A | 6/1992 | White, III | |
| 5,525,765 A | 6/1996 | Freiheit | |
| 5,530,211 A | 6/1996 | Rogers et al. | |
| 5,646,378 A | 7/1997 | Van Haaff | |
| 5,651,405 A | 7/1997 | Boeddeker et al. | |

(Continued)

FOREIGN PATENT DOCUMENTS

| CN | 105317248 | 2/2016 |
| SE | 1551458 | 5/2017 |
| WO | WO2017081169 | 5/2017 |

*Primary Examiner* — Clayton E. LaBalle
*Assistant Examiner* — Fang-Chi Chang
(74) *Attorney, Agent, or Firm* — Greenblum & Bernstein, P.L.C.

(57) ABSTRACT

A portable apparatus for providing acoustic and/or weather shielding for audio and/or video recording devices. The apparatus includes a collapsible housing case having a top panel, two side panels each attached to opposite sides of the top panel, and a rear panel attached to the top panel and a rigid side support attached to each side panel. The apparatus additionally includes a mounting bar that is attachable to each of the rigid side supports and at least one sound absorbing inner liner arranged on an interior side of the top panel, the two side panels and the rear panel. When the apparatus is in an operable configuration, the rear panel is structured and arranged to be moveable from a rear-access covering position to a rear-access non-covering position to provide a selectively openable rear access to an interior of the apparatus.

19 Claims, 7 Drawing Sheets

(56) References Cited

U.S. PATENT DOCUMENTS

| | | |
|---|---|---|
| 7,815,011 B2 | 10/2010 | Holzman et al. |
| 7,918,312 B2 | 4/2011 | Carlson |
| 8,136,626 B1 | 3/2012 | Aliev |
| 8,646,571 B2 | 2/2014 | Aliev |
| 8,978,816 B2 | 5/2015 | Slotznick |

* cited by examiner

PORTABLE APPARATUS FOR PROVIDING ACOUSTIC AND/OR WEATHER SHIELDING FOR AUDIO AND/OR VIDEO RECORDING DEVICES

BACKGROUND OF THE DISCLOSURE

1. Field of the Disclosure

This disclosure relates generally to the field of sound isolation enclosures and more specifically to portable acoustic shields for audio (e.g., voice) and video recording devices.

2. Background Discussion

With the development of small hand held audio and video recording devices, such as smartphones, digital voice recorders, digital video cameras and such, users are able to record everywhere. Development of voice recognition systems and voice-to-text software makes narration of documents, such as medical records a routine procedure in medical profession, research science, legal and other industries. Youtubers, videobloggers (or vloggers), podcasters and so on, all rely on their smartphones or small recording devices to provide commentary on events, review a product, make daily journal entries and/or even record short video clips on the go.

Even though the audio recording is not a new technology, the advanced voice recognition is new technology. With the availability of hand held recording devices, professionals are using advanced voice recognition everywhere and the clearer the sound that reaches the microphone, the more efficient the voice recognition software.

Youtube is also a relatively new, but explosive phenomenon. When beauty product Vloggers, for example, record their videos in a bathroom, sound reflections from the tiled walls of the bathroom can make their voice unintelligible and/or unbearable to listen to.

When physicians record their daily notes in a hospital hall, the reflections and reverberations in the busy hospital bounce back to the microphone and confuse the voice recognition software. As a result, multiple errors can occur, requiring the doctors to spend extra time proofreading and editing their records to avoid mistakes in the transcription. Currently, some hospitals may require doctors to type their notes into the computer. As a result, some doctors hire a typist to dictate their notes to them, which is inefficient and costly.

Attempts have been made to create small portable enclosures, designed mostly for voice-over actors that allow a microphone and an actor's face only to be surrounded by an enclosure. Even though such devices can be used with small recorders, such as smartphone, they are too bulky to be practical.

The disadvantages of the prior technology are that previously described devices are too bulky and/or heavy, which make them impractical, e.g., for non-professionals. Additionally, enclosures that use acoustic foam in their construction cannot be cleaned. Furthermore, enclosures with acoustic foam placed so close to a recording device would disproportionately absorb high frequency sound.

Video camera recording presents a special challenge that no other acoustic shield device has addressed yet. For example, because the viewfinder of the video camera is may be arranged on the opposite end of the lenses and not readily viewable from the side of the lenses, the videographer does not have access from one side of the shield, so as to be able to point and focus the camera on an object being filmed by the camera. As such, there is a need for an improved apparatus for video applications that allows for surrounding a microphone with sound absorbing or sound blocking barrier while allowing access to a viewfinder.

Use of the acoustic devices in the hospital environment provides additional challenge of bacterial contamination and necessity for the device to be cleaned easily and effectively.

Therefore there is a need to design a shielding device for sound reflections that is small in size, portable, efficient, durable, and can be folded away in a neat unobtrusive package and that can have easy-to-wipe surfaces and/or disposable liners for hospital environment applications.

BRIEF SUMMARY OF THE DISCLOSURE

Embodiments of the disclosure are directed to a portable apparatus for acoustically shielding audio and video recording devices from ambient noise, sound reflections and/or reverberations, as well as covering the equipment from inclement weather, wind interference and such.

Embodiments of the disclosure are directed to a portable apparatus for providing acoustic and/or weather shielding for audio and/or video recording devices. The apparatus comprises a collapsible housing case having a top panel, two side panels each attached to opposite sides of the top panel, and a rear panel attached to the top panel and a rigid side support attached to each side panel. The apparatus further comprises a mounting bar that is attachable to each of the rigid side supports and at least one sound absorbing inner liner arranged on an interior side of the top panel, the two side panels and the rear panel.

In embodiments, the mounting bar further comprises a grip bracket so that the apparatus is mountable on a support.

In further embodiments, when the apparatus is in an operable configuration, the rear panel is structured and arranged to be moveable from a rear-access covering position to a rear-access non-covering position to provide a selectively openable rear access to an interior of the apparatus.

In additional embodiments, at least a portion of the rear panel is arrangeable to form a base panel for use as a table-top shield when in a table-top configuration.

In yet further embodiments, the top panel and the rear panel are structured and arranged to be fastenable together to form a self-enclosing case.

In embodiments, the audio and/or video recording devices comprise smartphones, hand held digital recorders, and video cameras.

In further embodiments, the mounting bar is structured and arranged to provide tilt adjustability of the housing case.

In additional embodiments, the rigid side support comprises a mounting bracket, and wherein an orientation of apparatus is adjustable via the mounting bracket.

In yet further embodiments, the at least one inner liner is detachable from a respective panel.

In embodiments, the at least one inner liner is a disposable panel.

In further embodiments, the housing comprises a rigid material.

In additional embodiments, the housing comprises a weather-resistant material.

In yet further embodiments, housing comprises an easily cleanable outer surface.

In embodiments, the apparatus further comprises a rigid case in which the collapsible housing case is arranged.

In further embodiments, the rigid side support comprises a mounting bracket and an orientation of apparatus is adjustable via the mounting bracket.

In additional embodiments, the rigid side support comprises a mounting bracket and a plurality of insertable rigid support rods, wherein each side panel comprises a plurality of channels structured and arranged to accommodate a portion of a respective insertable rigid support rods therein.

In yet further embodiments, the plurality channels diverge from a respective mounting bracket.

In yet further embodiments, the rigid side support comprises a mounting bracket and a plurality of housing tubes on the mounting bracket, each structured and arranged to accommodate a portion of an insertable rigid support rod therein.

In embodiments, the apparatus further comprises a plurality of locking nuts, each locking nut configured to secure a respective insertable rigid support to a respective housing tube when the insertable rigid support is arranged in both the housing tube and a respective support channel.

In further embodiments, the rigid side support comprises a mounting bracket and a saddle bay in the mounting bracket structured and arranged to receive the mounting bar therein.

In additional embodiments, the rigid side support comprises a plurality of tilt adjustment notches structured and arranged to engage with the mounting bar to lock the housing at a selectable relative tilt orientation.

By implementing aspects of the disclosure, to the shielding apparatus provides effective protection of the recording devices acoustically and is foldable it in a small self-contained case. The embodiments of the disclosure also allows for mounting in a tripod (e.g., in case of a video camera), with access from the front and the back of the shielding apparatus. Embodiments of the disclosure also allows for mounting microphone stand therein, in case of a microphone or set it on a table for an unobtrusive use in an office.

One of the features of the embodiments of the disclosure is that when used with a video camera, for example, the shielding apparatus allows for actually opening up the back of the "enclosure" to point and focus the camera on an object and then reclose the back of the shielding apparatus. The videographer then can stand in front of the camera to film him/herself and be assured of the much better quality audio. In accordance with aspects of the disclosure, the apparatus not only shields camera from ambient noise, but also from, e.g., direct sunlight and/or ambient light, resulting in a better quality video. Furthermore, utilizing waterproof materials on the outside surfaces of the shielding apparatus renders the apparatus weatherproof, the enclosure protecting the equipment therein from elements (e.g., rain, snow, and/or other precipitation). It should be understood that the term "enclosure" as used herein does not necessarily indicate that the interior of the apparatus thereof is completely enclosed.

To fold the apparatus into a storage (or transportation) configuration, with an exemplary and non-limiting embodiment, the two side panels of the shielding apparatus can be tucked inside and the top panel and the base (or rear) panel are joined together into a compact flat package in accordance with aspects of the disclosure.

Another benefit of implementing aspects of the disclosure is that it, in embodiments, the apparatus may be configured for use in a hospital environment in mind. The enclosure may be constructed of easily wipable surfaces (e.g., interior and/or exterior surfaces) that withstand treatment (e.g., regular treatment) with disinfecting chemicals. Additionally, embodiments may be configured to accommodate tendencies of the modern medical industry for disposable products, in order to save time and money on washing and cleaning. Although disposing of the whole assembly is wasteful and inefficient, in accordance with aspects of the disclosure, the acoustic liners can be easily replaced. As such, in embodiments, the apparatus is configured such that at least some parts (e.g., liners) of the apparatus are disposable (and replaceable).

By implementing aspects of the disclosure, advantages of improved versatility, durability, ease of use, ease and speed of setting up (and folding down), light weight, compactness (e.g., sized for travel) and superior noise shielding efficiency are achieved. For environments that may be sensitive to, for example, bacterial infection, the apparatus may be configured with disposable parts and/or additional coverall to protect the apparatus (e.g., maintain sterility) when not in use. Embodiments of the disclosure are capable to function as a vocal booth, and/or photo or video camera booth. When folded, the enclosure is able to fit into small luggage or can be carried on its own.

Other aims and advantages of the present disclosure will become apparent from the following descriptions, taken in connection with the accompanying drawings, wherein, by way of illustration and example, embodiments of the present disclosure are disclosed.

BRIEF DESCRIPTION OF THE DRAWINGS

The novel features which are characteristic of the embodiments of the disclosure, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings wherein:

FIG. 12C is a front view of the device mounted on a tripod over a camera, with the back flap lowered down in accordance with aspects of the disclosure;

DETAILED DESCRIPTION OF EMBODIMENTS OF THE DISCLOSURE

Figure 1:
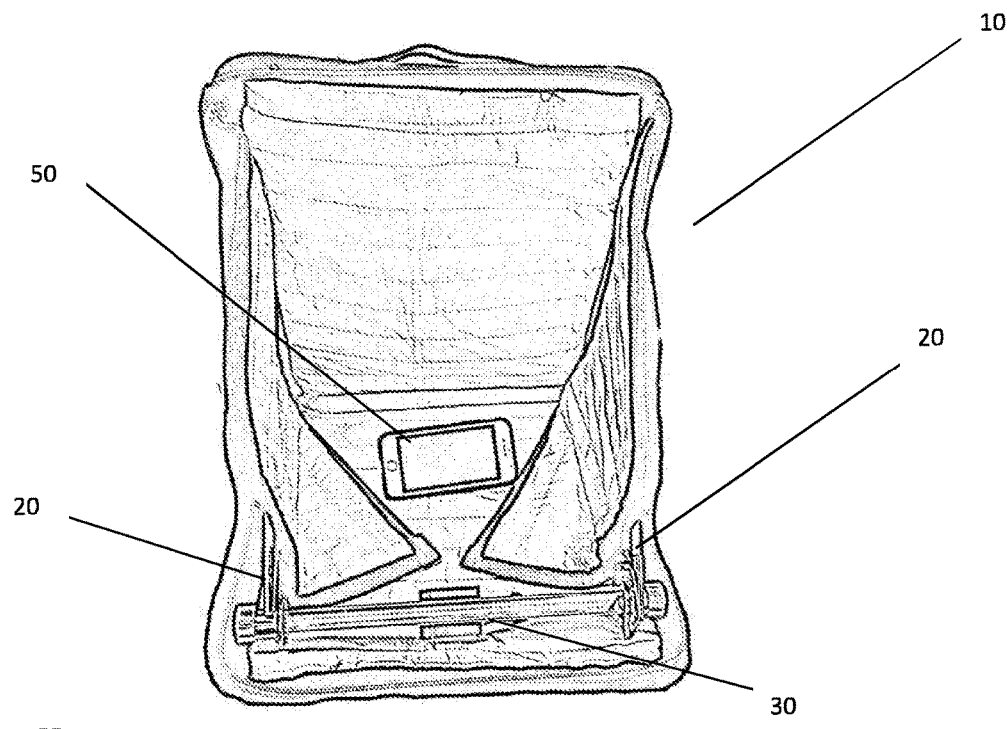
FIG. 1 is a perspective view of an exemplary shielding apparatus being used as a table top shield (e.g., in a first configuration) with the recording device inside in accordance with aspects of the disclosure.

Detailed descriptions of the embodiments of the disclosure are provided herein. It is to be understood, however, that the present disclosure may be embodied in various forms. Therefore, specific details disclosed herein are not to be interpreted as limiting, but rather as a basis for the claims and as a representative basis for teaching one skilled in the art to employ the present disclosure in virtually any appropriately detailed system, structure or manner.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The Figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded. For example, as used herein, the indefinite article "a" indicates one as well as more than one and does not necessarily limit its referent noun to the singular.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for instance a composition comprising a compound A may include other compounds besides A. However, the term "comprising" also covers the more restrictive meanings of "consisting essentially of" and "consisting of", so that for instance "a composition comprising a compound A" may also (essentially) consist of the compound A.

The various embodiments disclosed herein can be used separately and in various combinations unless specifically stated to the contrary.

Figure 2:
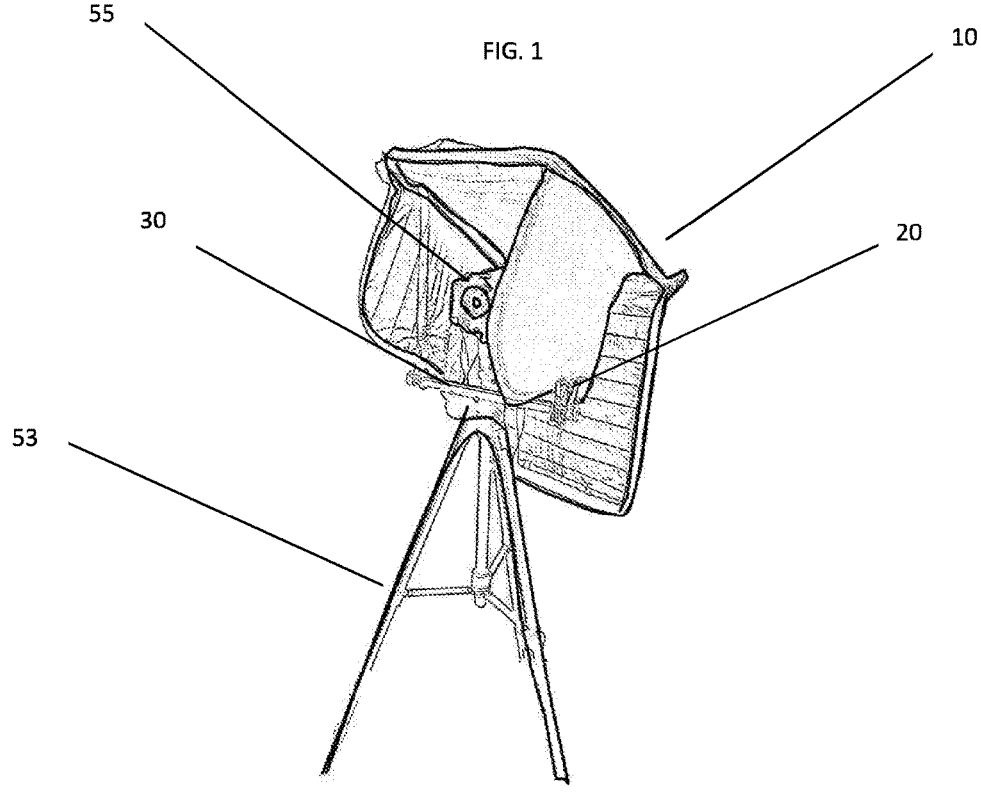
FIG. 2 is a perspective view of the apparatus being used mounted on a tripod over a video camera (e.g., in a second configuration) in accordance with aspects of the disclosure.

Referring now to FIGS. 1 and 2 there is shown a portable apparatus 10 for providing acoustic and weather shielding for audio and video recording devices in ready-to-use configurations.

FIG. 1 is a perspective view of an exemplary shielding device (or portable apparatus) being used as a table top shield (e.g., in a first configuration) with the recording device inside in accordance with aspects of the disclosure. As shown in FIG. 1, a portable apparatus 10 for providing acoustic and weather shielding for audio and video recording devices may be arranged in a table top configuration. In embodiments, the portable apparatus 10 includes a mounting bar 30 attached to side supports 20. As shown in FIG. 1, a recording device, such as smartphone 50, is arrangeable in the center of the apparatus 10. It should be noted, however, that while the mounting bar 30 provides a reliable holder for the side supports, in this tabletop configuration the mounting bar 30 is not essential. In contemplated embodiments, the side supports 20 would remain properly positioned as it is. In further contemplated embodiments, the apparatus 10 may be structured with a wider footing to stand on its own, or certain fixtures can be added to the bottom panel to provide a holder for the side supports. While the exemplary configuration of FIG. 1 includes a mounting bar 30, it should be understood that in some configurations (for example, the configuration of FIG. 1), it may not be necessary to utilize the mounting bar. For example, in this configuration, the side panels (which are internally supported) may possess sufficient structural stability to remain in an operable position without utilizing the mounting bar.

FIG. 2 is a perspective view of an embodiment of the disclosure being used mounted on a tripod over a video camera (e.g., in a second configuration) in accordance with aspects of the disclosure. As shown in FIG. 2, with this exemplary configuration of the apparatus 10, the mounting bar 30 is affixed to a tripod 53 (e.g., using a fastening element arranged beneath the camera attachment of the tripod). As shown in the exemplary embodiment of FIG. 2, the apparatus 10 has a camera 55 therein, which is mounted on the tripod 53 in a normal fashion.

Figure 3:
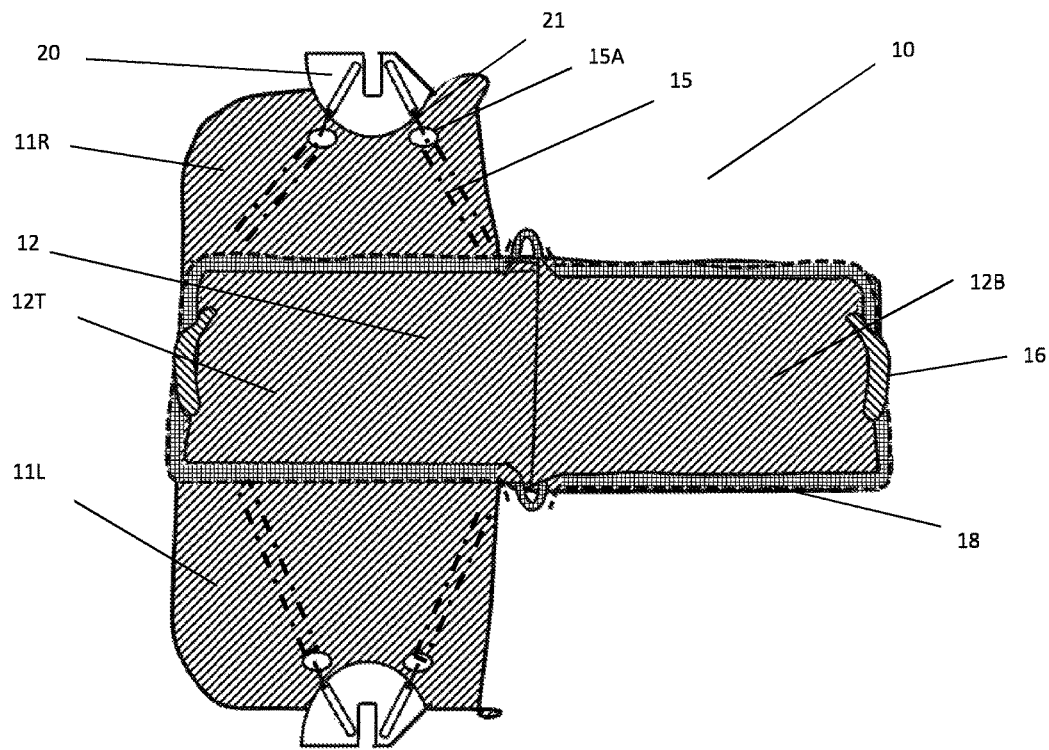
FIG. 3 is a top view of the outside surface of the apparatus that is opened up and laid out flat in accordance with aspects of the disclosure.

FIGS. 3-10 show additional details and features of embodiments of the disclosure. FIG. 3 is a top view of the outside surface of the apparatus 10 that is opened up and laid out flat in accordance with aspects of the disclosure. As shown in FIG. 3, the apparatus 10 is opened up and laid flat with the top (outside) surface facing up. In an exemplary and non-limiting embodiment, the apparatus 10 includes side panels 11R and 11L, main outer panel 12, which comprises top (or front) outer panel 12T and bottom (or back or rear) outer panel 12B. As shown in FIG. 3, in embodiments, panels 12T and 12B have handles 16 attached to each respective panel, and a fastener, such as zipper 18, sewn around the perimeter of the panel 12. In such a manner, when zipped together, the panel 12 folds in half and the panels 12T and 12B join together into a "flat" briefcase. In an exemplary embodiment, the outside surface of the apparatus 10 may be covered with weatherproof and/or abrasive-resistant fabric.

As shown in FIG. 3, the dashed lines represent rigid rod channels 15 for the side support assembly. The rigid rod channels 15 are constructed on the inner portion of the side panels 11R and 11L. Opening 15A is structured and arranged for a rod 21 to be insertable into the channel 15.

Figure 4:
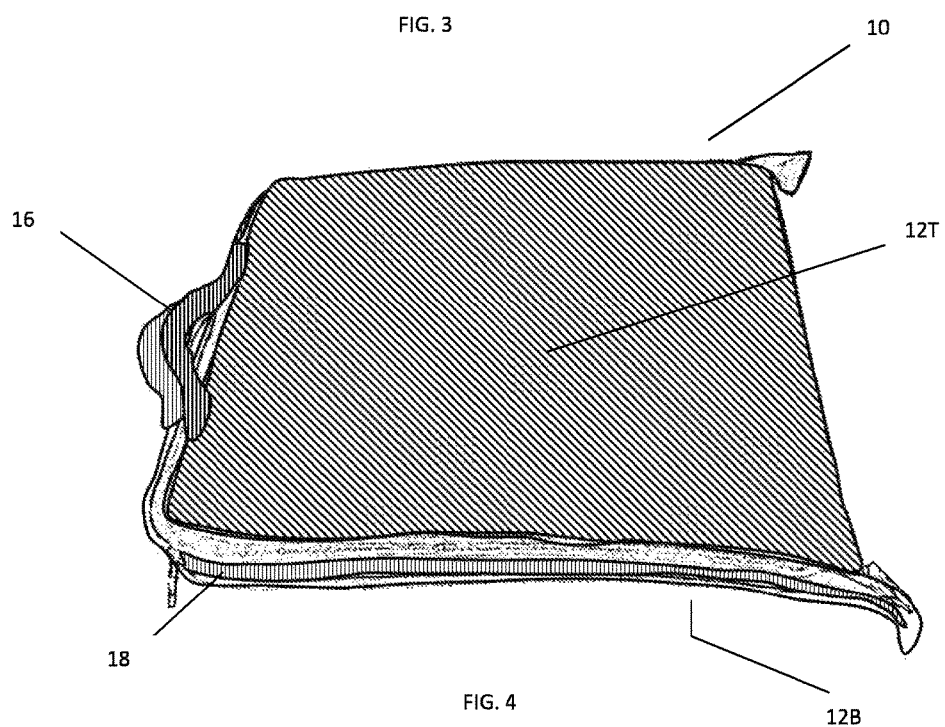
FIG. 4 is a perspective view of the apparatus in closed state (e.g., in a third configuration) in accordance with aspects of the disclosure.

FIG. 4 is a perspective view of an embodiment of the disclosure in closed state (e.g., in a third configuration) in accordance with aspects of the disclosure. FIG. 4 depicts a view of the apparatus 10 in a "closed" state with side panels (not visible) folded and tucked inside, and panels 12T and 12B joined together by the zipper 18 in a flat case configuration. As shown in FIG. 4, in this configuration, the handles 16 are now arranged adjacent one another for easy carry of the apparatus 10.

Figure 5:
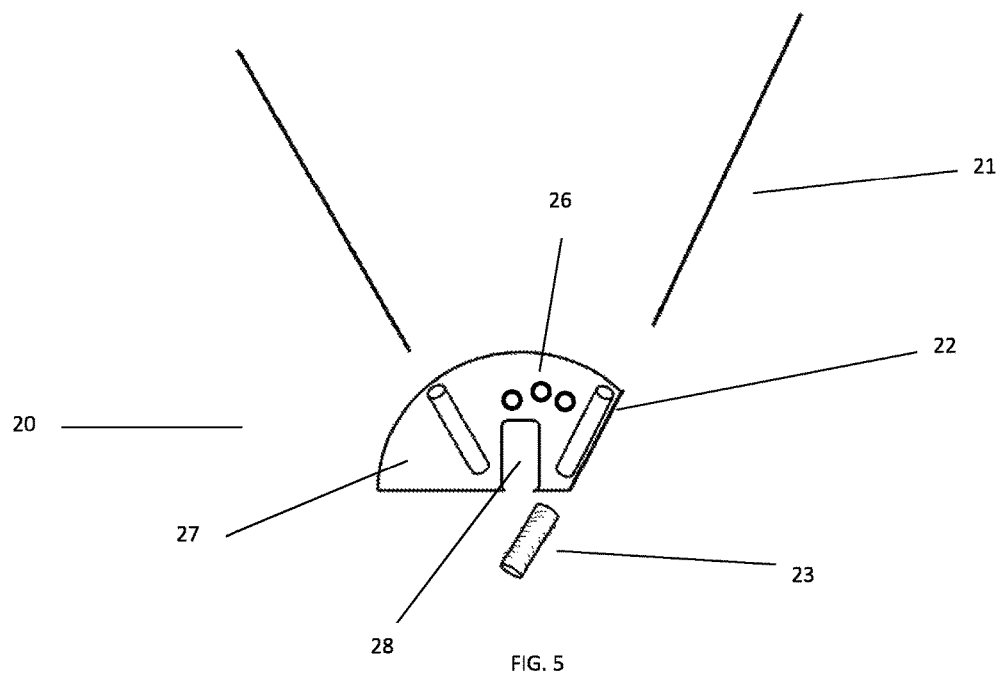
FIG. 5 is a diagram showing elements of the rigid side support assembly in accordance with aspects of the disclosure.

FIG. 5 is a view showing elements of the rigid side support assembly 20 in accordance with aspects of the disclosure. As shown in FIG. 5, the side support assembly 20 comprises side attachment plate 27 with two housing tubes 22 structured and arranged for holding the support rods 21 comprising a rigid material. Tap screw 23 is used to close the bottom end of the housing tube 22 and to hold the rod 21 in place within the housing tube 22. The side attachment plate 27 is provided with holes 26. The holes 26 are structured and arranged (e.g., through engagement with a pin on the mounting bar (or the attachment washer of the mounting bar)) to allow for adjusting an angle at which the device (e.g., camera) is positioned on the tripod. While side attachment plate 27 includes circular holes (e.g., for pre-set discrete angular adjustments), it should be understood that in contemplated embodiments, the holes may be an elongate hole (e.g., for continuous angular adjustments), or a tongue and groove, and may include a liner (e.g., a rubber liner) to increase friction between the side plate 27 and the mounting bar 30. The side attachment plate 27 is provided with a saddle bay 28, which is structured and arranged for attachment to the mounting bar 30. For example, in embodiments, the saddle bay 28 is sized to accommodate the mounting bar 30 therein, so that the attachment plate 27 is supported by the mounting bar 30.

Figure 6:
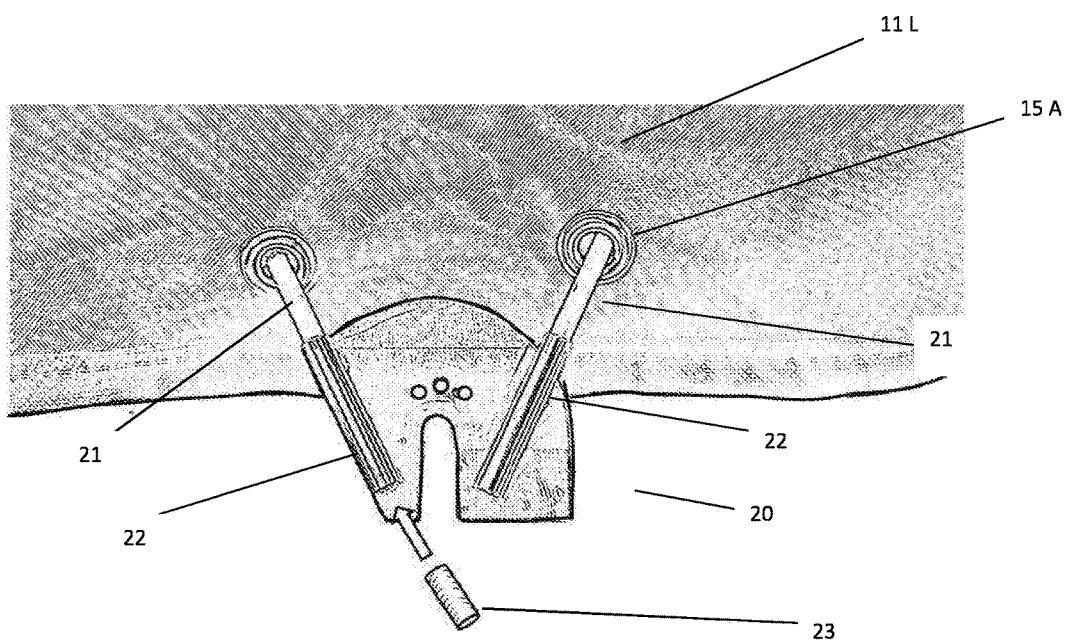
FIG. 6 is a close up view of the side support assembly installed into the apparatus in accordance with aspects of the disclosure.

FIG. 6 is a close-up view of the side support assembly 20 installed into the apparatus in accordance with aspects of the disclosure. As shown in FIG. 6, the side attachment assembly 20 is connected to the side panel 11L. In an exemplary embodiment, first a support rod 21 is inserted into the housing tube 22, and then is inserted through the opening 15A in the side panel 11L, wherein the rod is arranged in an internal rod support channel. Then a second support rod 21 is inserted through the second housing tube 22 (as shown by arrow) and through the second opening into the other support rod channel. Once a respective support rod 21 is in place in the housing tube 22 and in the support rod channel, the housing tube 22 may be closed with a cover (e.g., a tap screw 23).

Figure 7:
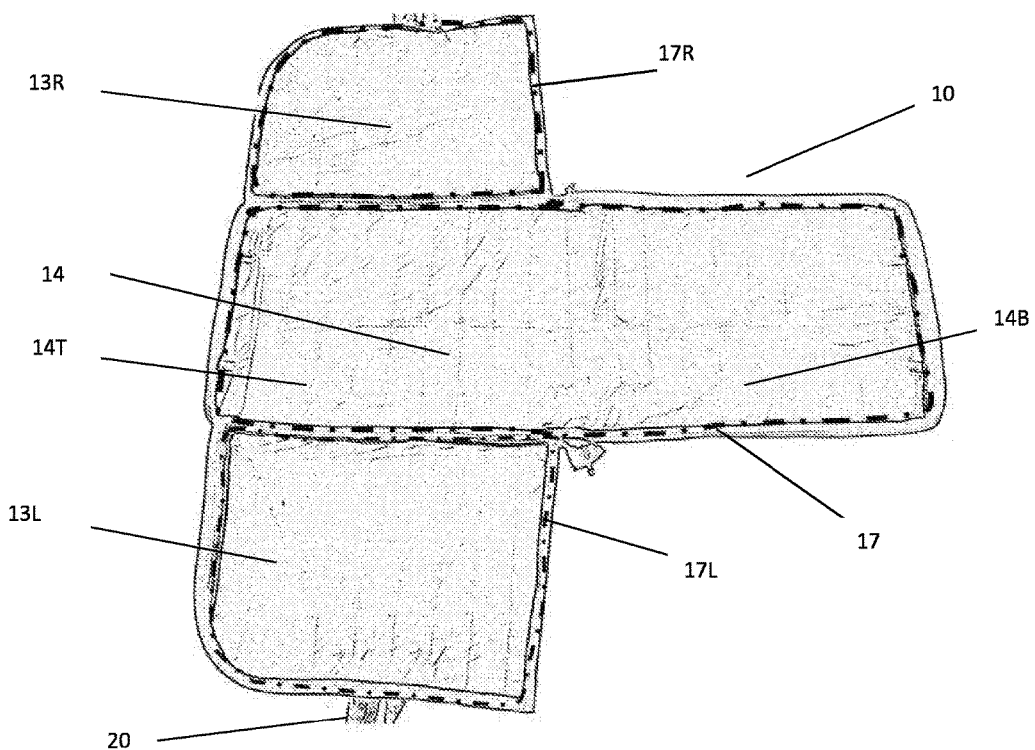
FIG. 7 is a view of the inside surface of the exemplary embodiment that is opened up and laid out flat in accordance with aspects of the disclosure.

FIG. 7 is a view of the inside surface of the apparatus that is opened up and laid out flat in accordance with aspects of the disclosure. As shown in FIG. 7, there is shown the portable apparatus 10 laid out flat with the inner sound absorption layers facing upwardly. The main inner sound absorption panel 14 includes a top portion 14T and a bottom portion 14B. In embodiments, the inner panel 14 is detachable from the portable apparatus 10 (e.g., detachable from the main outer panel 12 of the apparatus 10) and may be washed (or replaced by a new panel) as needed, allowing this inner panel 14 to be a disposable portion of the portable apparatus 10, in accordance with aspects of the disclosure. In embodiments, panel 14 is releasably attachable to the outer main panel 12 via a fastener 17 (e.g., a zipper). In embodiments, side inner panels 13R and 13L are connected to (and detachable from) respective outer side panels 11R and 11L by fasteners 17R and 17L (e.g., a zippers or hook and loop fastener), enabling side inner panels 13R and 13L to be disposable portions of the portable apparatus 10.

Figure 8:
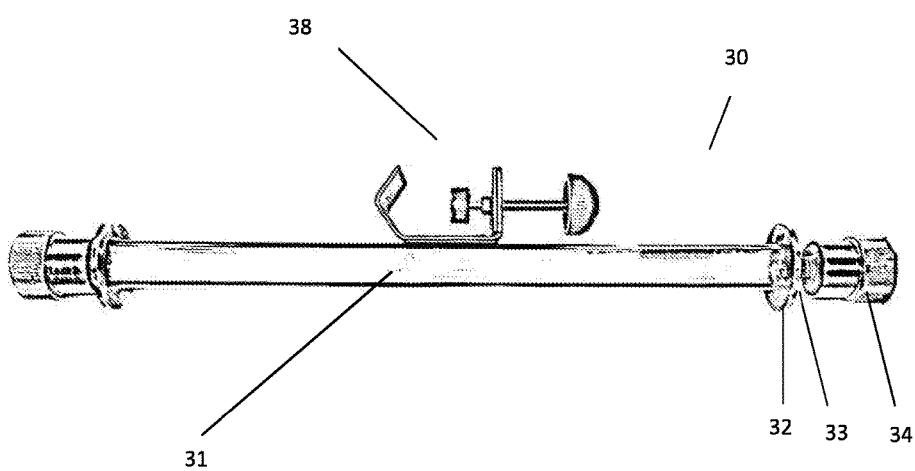
FIG. 8 is a perspective view of the mounting bar in accordance with aspects of the disclosure.

FIG. 8 is a perspective view of an exemplary and non-limiting mounting bar 30 in accordance with aspects of the disclosure. As shown in FIG. 8, a mounting bar 30 comprises a cross member 31, with attached to it washer 32, one on each side of the mounting bar 30, and includes on each end of the mounting bar 30 a protruding threaded bolt 33, to which closing nut 34 is fastenable so as to affix the side support assembly onto the mounting bar 30. In embodiment, the mounting bar 30 also includes a grip bracket 38 located in the middle of the cross member 31. In accordance with aspects of the disclosure, the grip bracket 38 may be a clamp or clip or any other suitable gripping device operable to provide a grip onto a support (e.g., a vertical support) such as tripod, microphone stand, and such. While this exemplary embodiment includes a single mounting bar 30, it should be understood that the disclosure contemplates the mounting bar can be triangular, can comprise, for example, two separate pieces clamping on each other, as well as a single piece made in different shapes. In contemplated embodiments, the cross member 31 may have an adjustable length, and the grip bar 38 may have a changeable orientation to allow mounting on vertical, horizontal or angular supports. In further contemplated embodiments, the washer 32 may have an adjustable configuration so that, in combination with side support assembly, allows for a different tilt of the device, and so on.

The purposes of the mounting bar 30 includes maintaining the two side support assemblies at a certain distance (e.g., when the apparatus 10 is in an operation configuration), and providing stability for the whole structure. A further purpose of the mounting bar 30 is to allow the whole device to be mountable on a vertical (or horizontal, or angular) support.

Figure 9:
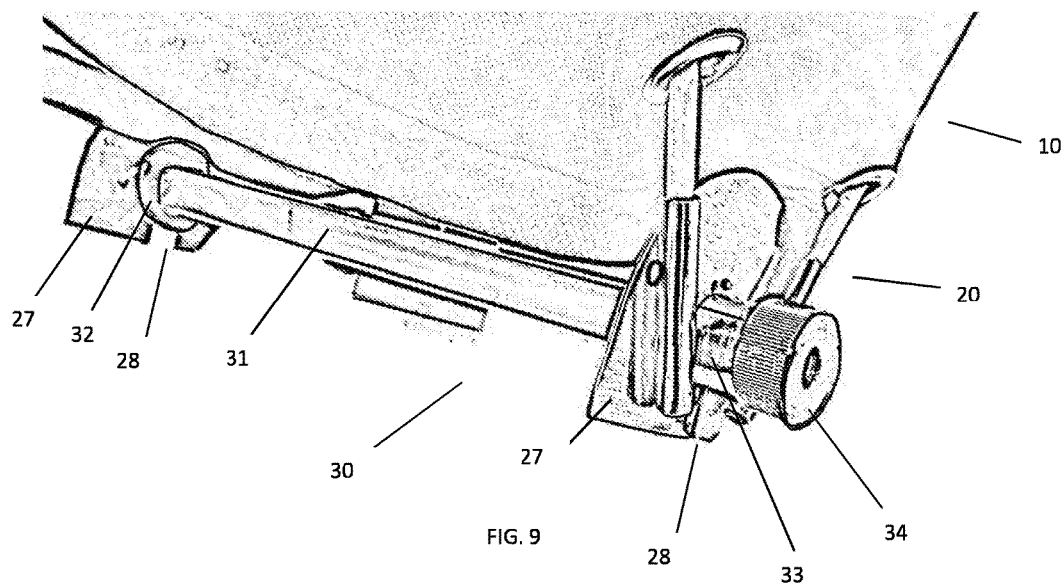
FIG. 9 is a perspective view of the mounting bar attached to the support assembly in accordance with aspects of the disclosure.

FIG. 9 is a perspective view of the mounting bar 30 attached to the support assembly in accordance with aspects of the disclosure. As shown in FIG. 9, the portable apparatus 10 with side assemblies 20 is mounted on the mounting bar 30. The viewpoint of FIG. 9 is of the right-hand side of the assembly from the outside and the left hand portion of the assembly from the inside. As shown in FIG. 9, protruding threaded bolt 33 of the mounting bar 30 is nested inside the saddle bay 28 of the attachment plate 27. This is true for both sides. When the nut 34 is tightened, the nut 34 pushes the attachment plate 27 against the attachment washer 32 providing tight hold of the device 10 on the mounting bar 30 at a desired (and adjustable) tilt angle. This desired tilt can be achieved by simply tightening the attachment plate 27 against attachment washer 32 where it needs to be. For more reliable hold the surfaces of the attachment washer 32 and the attachment plate 27 may have a tong and groove design or have additional rubber washers between the member 28, 32 and 34 to provide more friction between the adjacent members.

Figure 10:
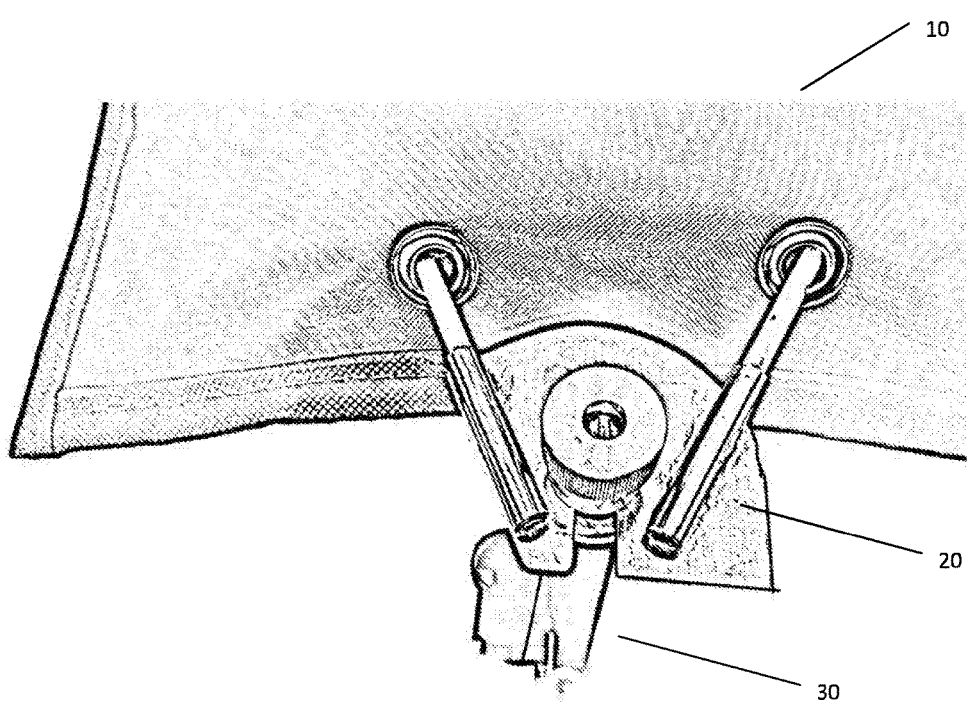
FIG. 10 is another perspective view of the mounting bar attachment to the support assembly from the outside in accordance with aspects of the disclosure.

FIG. 10 is side perspective view of the mounting bar 30 attachment to the support assembly from the outside in accordance with aspects of the disclosure. As shown in FIG. 10, when the nut 34 is tightened, the nut 34 pushes the attachment plate 27 against the attachment washer 32 providing tight hold of the device 10 on the mounting bar 30 at a desired (and adjustable) tilt angle.

Figures 11A, 11B:
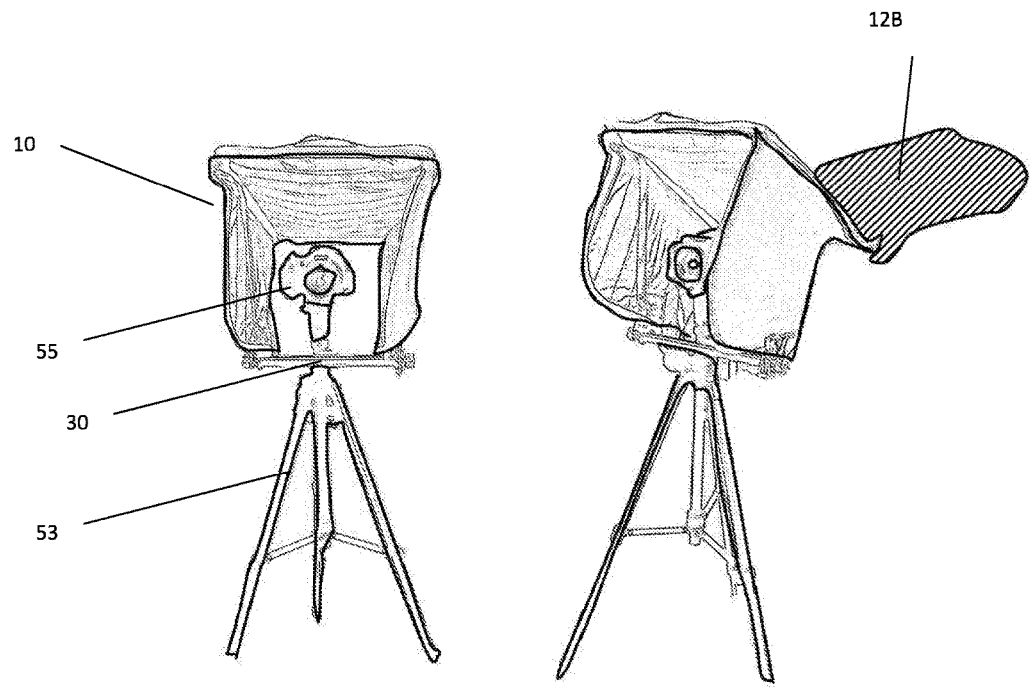
FIG. 11A is a front view of the device mounted on a tripod over a camera, with the back flap (or panel) "open" (e.g., in a fourth configuration) in accordance with aspects of the disclosure.
FIG. 11B is a perspective view of the device mounted on a tripod over a camera with the back panel lifted up to allow access to the camera from the back in accordance with aspects of the disclosure.

FIG. 11A is a front view of the portable apparatus 10 mounted on a tripod 53, and a camera mounted on the tripod 53 within the portable apparatus 10 with the back flap open, in accordance with aspects of the disclosure. FIG. 11B is a perspective view of the portable apparatus 10 mounted on the tripod over a camera 55 (e.g., a video camera or SLR camera) with the back side lifted up to allow access to the camera 53 from the back in accordance with aspects of the disclosure. As shown in FIGS. 11A and 11B, the portable apparatus 10 may be used with a video camera 53. Referring now to FIG. 11A, the portable apparatus 10 is mounted using the mounting bar 30 on the tripod 53 over a video camera 55, the back panel 14 of the portable apparatus 10 is flipped upwardly so as to rest on the upper surface of the portable apparatus 10 (and is not visible in this view). As shown in FIG. 11B, in accordance with aspects of the disclosure, the back panel 14 is liftable to allow access within the portable apparatus 10 e.g., to the viewfinder of the camera.

Figures 12A, 12B:
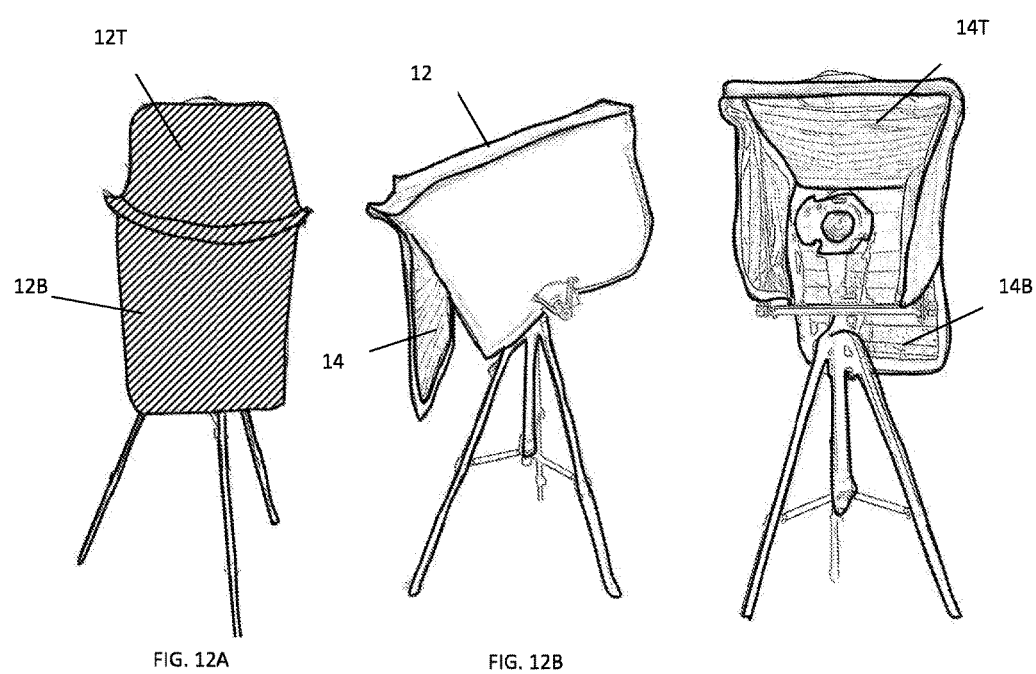
FIG. 12A is a back view of the device mounted on a tripod over a camera, with the back flap lowered down (e.g., in a sixth configuration) in accordance with aspects of the disclosure.
FIG. 12B is a side view of the device mounted on a tripod over a camera, with the back flap lowered down in accordance with aspects of the disclosure.

FIG. 12A is a rear view of the portable apparatus 10 mounted on a tripod over a camera, with the back flap lowered down in accordance with aspects of the disclosure. FIG. 12B is a side view of the portable apparatus 10 mounted on a tripod over a camera, with the back flap lowered down in accordance with aspects of the disclosure. FIG. 12C is a front view of the portable apparatus 10 mounted on a tripod over a camera, with the back flap lowered down (e.g., to a "closed" position) in accordance with aspects of the disclosure. FIGS. 12A-12C depict different perspectives of the portable apparatus 10 mounted on a tripod in accordance with aspects of the disclosure. FIG. 12A shows a rear view with the back panel 12B hanging downwardly. FIG. 12B shows side view of the portable apparatus 10 mounted on a tripod in accordance with aspects of the disclosure, and FIG. 12C shows a front view of the same.

Figures 13A, 13B:
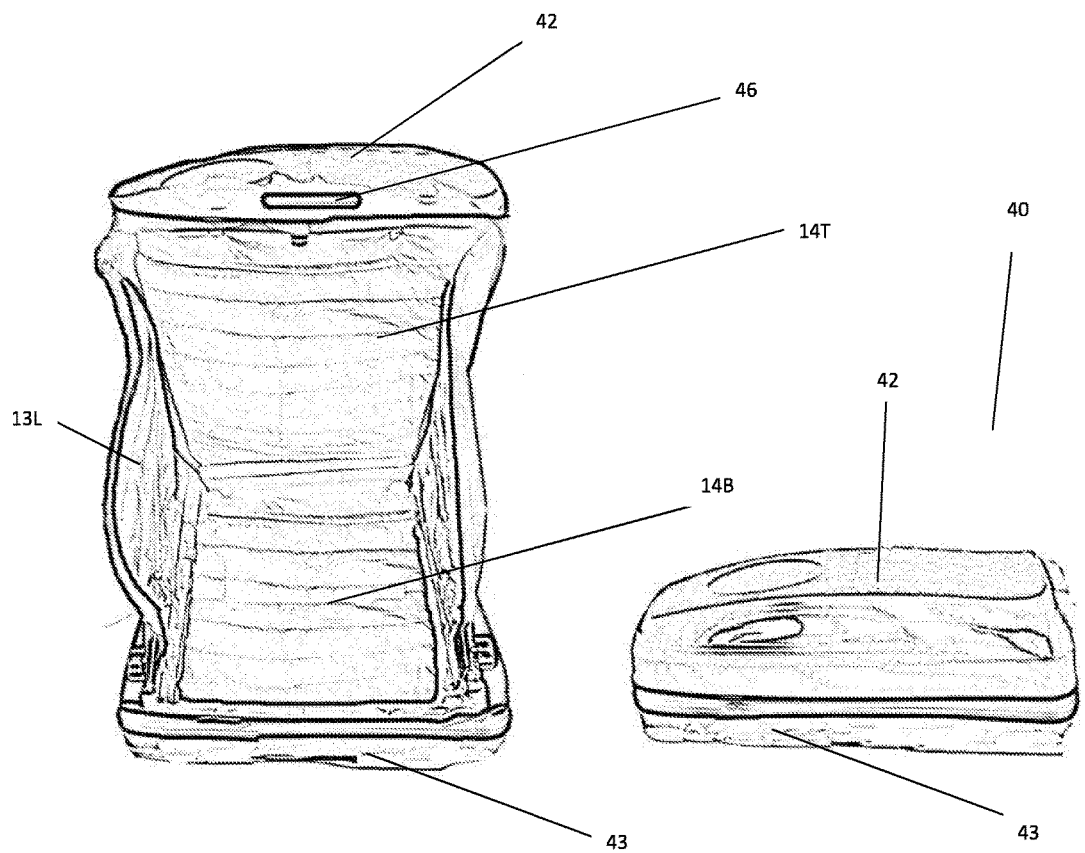
FIG. 13A is a front view of the open hard case device embodiment in accordance with aspects of the disclosure.
FIG. 13B is a side view of the closed hard case device embodiment in accordance with aspects of the disclosure.

FIG. 13A is a front view of an exemplary and non-limiting hard case embodiment (in an open configuration) in accordance with aspects of the disclosure and FIG. 13B is a side view of the hard case embodiment in accordance with aspects of the disclosure. As shown in FIGS. 13A and 13B, with this exemplary embodiment, the portable apparatus 10 in arranged in a hard case 130, (e.g., a clam shell case). As shown in FIG. 13A, the portable apparatus 10 is in an open orientation, where the top portion 42 with handle 46 is raised (e.g., about 60 degrees) or as suitable in relation to the bottom portion 43. In accordance with aspects of the disclosure, in embodiments, the sound absorbing liners 13 R, 13 L, 14T, and/or 14B are detachable. In accordance with aspects of the disclosure, this exemplary and non-limiting embodiment may be more suitable for, e.g., a hospital environment. For example, as the hard shell can be easily wiped and may be closed (e.g., in between sessions), this embodiment may provide better protection from bacterial contamination.

The above description makes the structure and the potential use of the device clear. But for practical reasons additional elements may be employed to improve the structural soundness of the assembly, improve the appearance of the device, make it more practical and easy to use, and reduce wear and tear. For example, in embodiments, the sound absorbing layer may be covered with a water proof and/or an abrasive-resistant outer layer material. Furthermore, in contemplated embodiments additional cushioning semi-rigid elements, such as polyethylene foam liner can be added to the top and the back panels to provide better support of the top "roof" panel. In embodiments, a shoulder strap may be added for convenience of transporting the portable apparatus 10 and so on. In embodiments, fast release fasteners may be added to the inner panels. In embodiments, a thin cloth liner may be added as a dust-proof or spray-proof protector of the inner panels. In at least some embodiments, the inner sound absorbing panels may be disposable. In at least some embodiments, the shape of the panels can be structured to provide uniformity (e.g., same size) for all panels, e.g., for easier replacements of the panels, if necessary (e.g., due to contamination). In embodiments, the apparatus may be configured for semi-stationary use, e.g., for hospital computer stations, where the outer case may comprise a rigid material. With such embodiments, additional measures may be necessary to address (e.g., compensate for) any concave shape of the "suitcase." For example, since concave hard surfaces can reflect sound and may tend to concentrate the sound in a central area, in embodiments, one or more diffusers may be incorporated in the apparatus to create a better acoustic environment.

While the disclosure has been described in connection with a preferred embodiment, it is not intended to limit the scope of the disclosure to the particular form set forth, but on the contrary, it is intended to cover such alternatives, modifications, and equivalents as may be included within the spirit and scope of the disclosure as defined by the appended claims.

While the disclosure has been described in connection with exemplary embodiments, it is not intended to limit the scope of the disclosure to the particular form set forth, but on the contrary, it is intended to cover such alternatives, modifications, and equivalents as may be included within the spirit and scope of the disclosure as defined by the appended claims.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel configuration is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure refers to specific embodiments, those skilled in the art will understand that various changes may be made and equivalents may be substituted for elements thereof without departing from the true spirit and scope of the embodiments of the disclosure. While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

LIST OF PARTS MARKED ON THE DRAWINGS

10—portable apparatus
11 R—right side outer panel
11 L—left side outer panel
12—Main Outer Panel
12T—Top half of outer Main panel
12B—Bottom half of outer panel
13R—right side inner panel
13L—left side inner panel
14—Main Inner Panel
14T—Top portion of Main Inner panel
14B—Bottom portion of Main Inner panel
15—rigid support channels
15A—rigid support channel opening
17—outer to inner panels connecting fastener (e.g., zipper)
16*b*—handles
18—Main outer panel top to bottom fastener (e.g., zipper)
20—side support assembly
21—rigid support rods
22—housing tubes
23—tap nut
26—tilt adjustment nudges
27—side attachment plate
28—saddle bay
30—mounting bar
31—cross bar member
32—attachment washer
33—protruding threaded bolt member
34—closing nut
38—grip bracket
40—Hard case embodiment (e.g., clam shell)
42—top cover
43—Bottom Cover
46—handle
50—recording device (e.g., smartphone)
53—tripod
55—video camera

What is claimed is:

1. A portable apparatus for providing acoustic and/or weather shielding for audio and/or video recording devices, the apparatus comprising:
 a collapsible housing case having a top panel, two side panels each attached to opposite sides of the top panel, and a rear panel attached to the top panel;
 a rigid side support attached to each side panel;
 a mounting bar that is attachable to each of the rigid side supports; and at least one sound absorbing inner liner arranged on an interior side of the top panel, the two side panels and the rear panel, wherein the rigid side support comprises a mounting bracket, and wherein an orientation of the apparatus is adjustable via the mounting bracket.

2. The apparatus of claim 1, wherein the mounting bar further comprises a grip bracket so that the apparatus is mountable on a support.

3. The apparatus of claim 1, wherein when the apparatus is in an operable configuration, the rear panel is structured and arranged to be moveable from a rear-access covering position to a rear-access non-covering position to provide a selectively openable rear access to an interior of the apparatus.

4. The apparatus of claim 1, wherein at least a portion of the rear panel is arrangeable to form a base panel for use as a table-top shield when in a table-top configuration.

5. The apparatus of claim 1, wherein the top panel and the rear panel are structured and arranged to be fastenable together to form a self-enclosing case.

6. The apparatus of claim 1, wherein the audio and/or video recording devices comprise smartphones, hand held digital recorders, and video cameras.

7. The apparatus of claim 1, wherein the mounting bar is structured and arranged to provide tilt adjustability of the housing case.

8. The apparatus of claim 1, wherein the at least one inner liner is detachable from a respective panel.

9. The apparatus of claim 1, wherein the at least one inner liner is a disposable panel.

10. The apparatus of claim 1, wherein the housing comprises a rigid material.

11. The apparatus of claim 1, wherein the housing comprises a weather-resistant material.

12. The apparatus of claim 1, wherein the housing comprises an easily cleanable outer surface.

13. The apparatus of claim 1, further comprising a rigid case in which the collapsible housing case is arranged.

14. The apparatus of claim 1, wherein the rigid side support comprises:
  a mounting bracket; and
  a plurality of housing tubes on the mounting bracket, each structured and arranged to accommodate a portion of an insertable rigid support rod therein.

15. The apparatus of claim 14, further comprising a plurality of locking nuts, each locking nut configured to secure a respective insertable rigid support to a respective housing tube when the insertable rigid support is arranged in both the housing tube and a respective support channel.

16. The apparatus of claim 1, wherein the rigid side support comprises a plurality of tilt adjustment notches structured and arranged to engage with the mounting bar to lock the housing at a selectable relative tilt orientation.

17. A portable apparatus for providing acoustic and/or weather shielding for audio and/or video recording devices, the apparatus comprising:
  a collapsible housing case having a top panel, two side panels each attached to opposite sides of the top panel, and a rear panel attached to the top panel;
  a rigid side support attached to each side panel;
  a mounting bar that is attachable to each of the rigid side supports; and
  at least one sound absorbing inner liner arranged on an interior side of the top panel, the two side panels and the rear panel, wherein the rigid side support comprises:
  a mounting bracket; and
  a plurality of insertable rigid support rods, wherein each side panel comprises a plurality of channels structured and arranged to accommodate a portion of a respective insertable rigid support rods therein.

18. The apparatus of claim 17, wherein the plurality channels diverge from a respective mounting bracket.

19. A portable apparatus for providing acoustic and/or weather shielding for audio and/or video recording devices, the apparatus comprising:
  a collapsible housing case having a top panel, two side panels each attached to opposite sides of the top panel, and a rear panel attached to the top panel;
  a rigid side support attached to each side panel;
  a mounting bar that is attachable to each of the rigid side supports; and
  at least one sound absorbing inner liner arranged on an interior side of the top panel, the two side panels and the rear panel, wherein the rigid side support comprises:
  a mounting bracket; and
  a saddle bay in the mounting bracket structured and arranged to receive the mounting bar therein.

* * * * *